US007371169B2

(12) United States Patent
Baerlocher

(10) Patent No.: US 7,371,169 B2
(45) Date of Patent: May 13, 2008

(54) METHOD AND APPARATUS FOR DETERMINING A GAMING DEVICE AWARD

(75) Inventor: Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 782 days.

(21) Appl. No.: 10/644,309

(22) Filed: Aug. 20, 2003

(65) Prior Publication Data

US 2005/0043085 A1 Feb. 24, 2005

(51) Int. Cl.
*A63F 13/00* (2006.01)

(52) U.S. Cl. ............................ 463/20; 463/16; 463/31; 463/42

(58) Field of Classification Search .................. 463/20, 463/33, 16, 42
See application file for complete search history.

(56) References Cited

U.S. PATENT DOCUMENTS

| | | | |
|---|---|---|---|
| 2,743,108 | A | 4/1956 | Sanders |
| 3,904,207 | A | 9/1975 | Gold |
| 4,448,419 | A | 5/1984 | Telnaes |
| 4,582,324 | A | 4/1986 | Koza et al. |
| 4,624,459 | A | 11/1986 | Kaufman |
| 4,695,053 | A | 9/1987 | Vazquez, Jr. et al. |
| 4,775,155 | A | 10/1988 | Lees |
| 4,991,848 | A | 2/1991 | Greenwood et al. |
| 5,046,737 | A | 9/1991 | Fienberg |
| 5,178,390 | A | 1/1993 | Okada |
| 5,205,555 | A | 4/1993 | Hamano |
| 5,342,047 | A | 8/1994 | Heidel et al. |
| 5,449,173 | A | 9/1995 | Thomas et al. |
| 5,456,465 | A | 10/1995 | Durham |
| 5,524,888 | A | 6/1996 | Heidel |
| 5,536,016 | A | 7/1996 | Thompson |
| 5,542,669 | A | 8/1996 | Charron et al. |

(Continued)

FOREIGN PATENT DOCUMENTS

EP 0874337 A1 10/1998

(Continued)

OTHER PUBLICATIONS

International Search Report dated Dec. 21, 2004.

(Continued)

*Primary Examiner*—Robert E. Pezzuto
*Assistant Examiner*—Ross Williams
(74) *Attorney, Agent, or Firm*—Bell, Boyd & Lloyd LLP

(57) ABSTRACT

A method and apparatus for determining an award in a wagering gaming device. A plurality of different values are displayed, at least one of which is duplicated to create a set of values. The gaming device sorts the values of the set into a number of masked divisions. The amount of values in each division is less than the number of different values available to the player before the player's selection of one of the divisions. That selection therefore narrows the field of possible award values. If the selected division includes only one value, the player receives that value. If not, at least one of the values in the selected division is duplicated and the above narrowing process is repeated until a selected division has only one value, which is awarded to the player.

36 Claims, 12 Drawing Sheets

U.S. PATENT DOCUMENTS

| | | | | |
|---|---|---|---|---|
| 5,560,603 | A | 10/1996 | Seelig et al. | |
| 5,611,535 | A | 3/1997 | Tiberio | |
| 5,639,089 | A | 6/1997 | Matsumoto et al. | |
| 5,647,798 | A | 7/1997 | Falciglia | |
| 5,711,525 | A | 1/1998 | Breeding | |
| 5,743,524 | A | 4/1998 | Nannicola | |
| 5,755,619 | A | 5/1998 | Matsumoto et al. | |
| 5,769,716 | A | 6/1998 | Saffari et al. | |
| 5,772,509 | A | 6/1998 | Weiss | |
| 5,775,692 | A | 7/1998 | Watts et al. | |
| 5,788,573 | A | 8/1998 | Baerlocher et al. | |
| 5,813,911 | A | 9/1998 | Margolin | |
| 5,823,873 | A | 10/1998 | Moody | |
| 5,823,874 | A | 10/1998 | Adams | |
| 5,830,069 | A * | 11/1998 | Soltesz et al. | 463/42 |
| 5,833,536 | A | 11/1998 | Davids et al. | |
| 5,833,538 | A | 11/1998 | Weiss | |
| 5,848,932 | A | 12/1998 | Adams | |
| 5,851,148 | A | 12/1998 | Brune et al. | |
| 5,855,514 | A | 1/1999 | Kamille | |
| 5,873,781 | A | 2/1999 | Keane | |
| 5,882,261 | A | 3/1999 | Adams | |
| 5,893,718 | A | 4/1999 | O'Donnell | |
| 5,902,184 | A | 5/1999 | Bennett et al. | |
| 5,911,418 | A | 6/1999 | Adams | |
| 5,935,002 | A | 8/1999 | Falciglia | |
| 5,947,820 | A | 9/1999 | Morro et al. | |
| 5,951,397 | A | 9/1999 | Dickinson | |
| 5,964,463 | A | 10/1999 | Moore, Jr. | |
| 5,967,894 | A | 10/1999 | Kinoshita et al. | |
| 5,976,016 | A | 11/1999 | Moody et al. | |
| 5,980,384 | A | 11/1999 | Barrie | |
| 5,984,781 | A | 11/1999 | Sunaga | |
| 5,997,400 | A | 12/1999 | Seelig et al. | |
| 5,997,401 | A | 12/1999 | Crawford | |
| 6,004,207 | A | 12/1999 | Wilson, Jr. et al. | |
| 6,007,066 | A | 12/1999 | Moody | |
| 6,015,346 | A | 1/2000 | Bennett | |
| 6,019,369 | A | 2/2000 | Nakagawa et al. | |
| 6,033,307 | A | 3/2000 | Vancura | |
| 6,056,642 | A | 5/2000 | Bennett | |
| 6,059,289 | A | 5/2000 | Vancura | |
| 6,059,658 | A | 5/2000 | Mango et al. | |
| 6,062,980 | A | 5/2000 | Luciano | |
| 6,089,976 | A | 7/2000 | Schneider et al. | |
| 6,089,977 | A | 7/2000 | Bennett | |
| 6,089,978 | A | 7/2000 | Adams | |
| 6,093,102 | A | 7/2000 | Bennett | |
| 6,102,798 | A | 8/2000 | Bennett | |
| 6,120,031 | A | 9/2000 | Adams | |
| 6,126,541 | A | 10/2000 | Fuchs | |
| 6,126,542 | A | 10/2000 | Fier | |
| 6,135,884 | A | 10/2000 | Hedrick et al. | |
| 6,142,873 | A | 11/2000 | Weiss et al. | |
| 6,142,874 | A | 11/2000 | Kodachi et al. | |
| 6,142,875 | A | 11/2000 | Kodachi et al. | |
| 6,146,273 | A | 11/2000 | Olsen | |
| 6,149,156 | A | 11/2000 | Feola | |
| 6,159,095 | A | 12/2000 | Frohm et al. | |
| 6,159,096 | A | 12/2000 | Yoseloff | |
| 6,159,097 | A | 12/2000 | Gura | |
| 6,159,098 | A | 12/2000 | Slomiany et al. | |
| 6,162,121 | A | 12/2000 | Morro et al. | |
| 6,164,652 | A | 12/2000 | Lauretta et al. | |
| 6,168,520 | B1 | 1/2001 | Baerlocher et al. | |
| 6,168,523 | B1 | 1/2001 | Piechowiak et al. | |
| 6,173,955 | B1 | 1/2001 | Perrie et al. | |
| 6,174,233 | B1 | 1/2001 | Sunaga et al. | |
| 6,174,235 | B1 | 1/2001 | Walker et al. | |
| 6,190,254 | B1 | 2/2001 | Bennett | |
| 6,190,255 | B1 | 2/2001 | Thomas et al. | |
| 6,203,429 | B1 | 3/2001 | Demar et al. | |
| 6,210,279 | B1 | 4/2001 | Dickinson | |
| 6,213,876 | B1 | 4/2001 | Moore, Jr. | |
| 6,224,483 | B1 | 5/2001 | Mayeroff | |
| 6,227,971 | B1 | 5/2001 | Weiss | |
| 6,231,442 | B1 | 5/2001 | Mayeroff | |
| 6,231,445 | B1 | 5/2001 | Acres | |
| 6,234,897 | B1 | 5/2001 | Frohm et al. | |
| 6,254,481 | B1 | 7/2001 | Jaffe | |
| 6,261,177 | B1 | 7/2001 | Bennett | |
| 6,302,790 | B1 | 10/2001 | Brossard | |
| 6,305,686 | B1 | 10/2001 | Perrie et al. | |
| 6,309,300 | B1 | 10/2001 | Glavich | |
| 6,312,334 | B1 | 11/2001 | Yoseloff | |
| 6,315,660 | B1 | 11/2001 | DeMar et al. | |
| 6,315,664 | B1 | 11/2001 | Baerlocher et al. | |
| 6,319,124 | B1 | 11/2001 | Baerlocher et al. | |
| 6,322,309 | B1 | 11/2001 | Thomas et al. | |
| 6,328,649 | B1 | 12/2001 | Randall et al. | |
| 6,343,988 | B1 | 2/2002 | Walker et al. | |
| 6,346,043 | B1 | 2/2002 | Colin et al. | |
| 6,347,996 | B1 | 2/2002 | Gilmore et al. | |
| 6,364,766 | B1 | 4/2002 | Anderson et al. | |
| 6,364,767 | B1 | 4/2002 | Brossard et al. | |
| 6,368,218 | B2 | 4/2002 | Angell, Jr. | |
| 6,375,187 | B1 | 4/2002 | Baerlocher et al. | |
| 6,398,644 | B1 | 6/2002 | Perrie et al. | |
| 6,413,161 | B1 | 7/2002 | Baerlocher et al. | |
| 6,428,412 | B1 | 8/2002 | Anderson et al. | |
| 6,439,995 | B1 | 8/2002 | Hughs-Baird et al. | |
| 6,443,837 | B1 | 9/2002 | Jaffe et al. | |
| 6,464,582 | B1 | 10/2002 | Baerlocher et al. | |
| 6,506,118 | B1 | 1/2003 | Baerlocher et al. | |
| 6,514,141 | B1 | 2/2003 | Kaminkow et al. | |
| 6,565,432 | B2 | 5/2003 | Moody | |
| 6,572,471 | B1 | 6/2003 | Bennett | |
| 6,575,830 | B2 | 6/2003 | Baerlocher et al. | |
| 6,582,307 | B2 | 6/2003 | Webb | |
| 6,585,591 | B1 | 7/2003 | Baerlocher et al. | |
| 6,599,185 | B1 | 7/2003 | Kaminkow et al. | |
| 6,602,137 | B2 | 8/2003 | Kaminkow et al. | |
| 6,607,437 | B2 | 8/2003 | Casey et al. | |
| 6,609,974 | B2 | 8/2003 | Mead et al. | |
| 6,632,141 | B2 | 10/2003 | Webb et al. | |
| 2002/0072402 | A1 | 6/2002 | Baerlocher | |
| 2002/0142822 | A1 | 10/2002 | Baerlocher et al. | |
| 2002/0151350 | A1 | 10/2002 | Baerlocher et al. | |
| 2002/0155883 | A1 | 10/2002 | Baerlocher | |
| 2003/0040360 | A1 | 2/2003 | Kaminkow | |
| 2003/0045348 | A1 | 3/2003 | Palmer et al. | |
| 2003/0045350 | A1 | 3/2003 | Baerlocher et al. | |
| 2003/0060260 | A1 | 3/2003 | Gerrard et al. | |
| 2003/0064777 | A1 | 4/2003 | Baerlocher | |
| 2003/0064795 | A1 | 4/2003 | Baerlocher et al. | |
| 2003/0078093 | A1 | 4/2003 | Simms et al. | |
| 2003/0087693 | A1 | 5/2003 | Baerlocher et al. | |
| 2003/0119572 | A1 | 6/2003 | Moody et al. | |
| 2003/0157982 | A1 | 8/2003 | Gerrard et al. | |
| 2003/0162578 | A1 | 8/2003 | Baerlocher et al. | |
| 2003/0162584 | A1 | 8/2003 | Hughs-Baird et al. | |
| 2003/0181233 | A1 | 9/2003 | Baerlocher et al. | |
| 2003/0199314 | A1 | 10/2003 | Baerlocher et al. | |
| 2003/0214097 | A1 | 11/2003 | Moody | |
| 2003/0224846 | A1 | 12/2003 | Baerlocher | |
| 2004/0009805 | A1 | 1/2004 | Baerlocher et al. | |
| 2005/0049041 | A1 | 3/2005 | Baerlocher et al. | |

FOREIGN PATENT DOCUMENTS

| | | | |
|---|---|---|---|
| EP | 0926645 | A2 | 6/1999 |
| EP | 0944030 | A2 | 9/1999 |
| EP | 0945837 | A2 | 9/1999 |
| EP | 0981119 | A2 | 2/2000 |

| | | | |
|---|---|---|---|
| EP | 0984408 | A2 | 3/2000 |
| EP | 0984409 | A2 | 3/2000 |
| GB | 2 144 644 | A | 8/1983 |
| GB | 2 137 392 | A | 10/1984 |
| GB | 2 191 030 | A | 12/1987 |
| JP | 10-328351 | | 12/1998 |
| WO | WO 9732285 | | 9/1997 |
| WO | WO 00/12186 | | 3/2000 |
| WO | WO 03/009240 | A1 | 1/2003 |

OTHER PUBLICATIONS

Addams Family Entertainment Advertisement written by IGT and Strictly Slots, published in 2000.
Bonus Times Article written by Strictly slots, published in 2000.
By George written by IGT, published in 2002.
Caribbean Gold II Brochure written by Aristocrat Leisure Industries, published in 1998.
Cash Box Brochure and Article written by Anchor Gaming, published in 2000.
Description of Let's Make a Deal Television Show (website) written by lestmakesadeal.com, printed Mar. 6, 2001.
Easy Street Advertisements and Articles written by Casino Data Systems, published in 2000.
Elvis Advertisement written by IGT, published in 1999.
Fox "N" Hound Advertisement written by IGT, published in 2000.
Jackpot Party Brochure and Articles written by WMS Gaming, Inc, published in 1998.
Keep Your Hat On Advertisement written by Aristocrat, published in 2001.
Let's Make a Deal (website) written by fortunecity.com (4 pages), printed Mar. 21, 2001.
Let's Make a Deal (website) written by geocities.com (10 pages), printed Mar. 21, 2001.
Let's Make a Deal (website) written by Illinoislottery.com (1 page), printed Mar. 21, 2001.
Let's Make a Deal Advertisement written by Shuffle Master and IGT, published in 1999.
Little Green Men Advertisement and Article written by IGT, Strictly Slots, published in 2000.
MegaJackpots Advertisement written by IGT, published in 1998.
Money Grab Article written by Strictly Slots, published in 2001.
Money in the Bank Advertisement written by Strictly Slots Konami, published in 2001.
Monopoly Advertisements and Articles written by WMS Gaming, Inc, Strictly Slots, published in 1998, 1999, 2000.
Monopoly Party Train Article written by Strictly Slots, published in 2002.
Neon Lights written by IGT, published in 2000.
On the Money Article written by Strictly Slots, Casino Data Systems, published in 2000.
Piggy Banking and Big Bang Piggy Banking Brochures, WMS Gaming, Inc., undated.
Polly & Roger Advertisement written by VLC, Inc., published in 2000.
Price is Right "Cliff Hangers" Description (website) written by www.geocities.com; members.aol.com, printed Mar. 21, 2001.
Price is Right "Showcases" Description (website) written by schuminweb.com, printed Mar. 16, 2001.
Psycho Cash Beach Club (including knockouts) written by Barcrest, published Prior to 1998.
Richard Petty Advertisement written by IGT, published in 2000.
South Park—Dodgeball Advertisement written by IGT, published in 2000.
Spell Binder Advertisement written by IGT, published in 2000.
Sphinx Advertisement written by Atronic Casino Technology, Ltd., published in 1997.
Texas Tea Advertisement written by IGT, published in 2000.
The Deals of Let's Make a Deal (website) written by fortunecity.com (2 pages), printed on Mar. 16, 2000.
The Official Let's Make a Deal (Website) written by Bally Gaming System, printed on Mar. 16, 2001.
Top Cat Advertisement written by WMS Gaming, Inc., published prior to 2000.
Totem Pole Advertisement written by IGT, published in 1997.
Treasure Wheel/Treasure Tunnel Advertisement written by Sigma Game, Inc., published prior to 2000.
Wheel of Fortune Advertisement written by IGT, published in 1998.
Wheel of Fortune Advertisement written by IGT, published in 1999.
Wheel of Poker Article written by Strictly Slots (Anchor Games), published in 2000.
Winning Streak Brochure written by Aristocrat Leisure Industries, published in 1994.
Winning Streak Web Site Description (website) written by WMS Gaming, Inc., printed Mar. 21, 2001.
"Deal or No Deal" game show description printed from http://en.wikipedia.org/wiki/Deal_or_No_Deal on Oct. 9, 2006.
Miljoenenjacht (Netherlands) game show description printed from http://en.wlkipedia.org/wiki/Miljoenenjact_(Netherlands) on Oct. 9, 2006, available prior to Aug. 2003.
"Deal or No Deal (Australian game show)" description printed from http://en.wikipedia.org/wiki/Deal_or_No_Deal_(Australian_game_show) on Oct. 9, 2006.
"Deal or No Deal (UK game show)" description printed from http://en.wikipedia.org/wiki/Deal_or_No_Deal_(UK_game_show) on Dec. 21, 2006.

* cited by examiner

METHOD AND APPARATUS FOR DETERMINING A GAMING DEVICE AWARD

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates in general to a gaming device, and more particularly to a gaming device having a method and apparatus for allowing a player to have multiple selections with which to choose an award from a plurality of possible awards.

Gaming devices currently include primary or base games and secondary or bonus games. Gaming devices currently exist with secondary or bonus games or rounds in which a player has one or more opportunities to choose masked bonus awards from a pattern of masked awards displayed to the player. When the player chooses a masked award from the pattern, the game removes the mask and either awards the player with a bonus value or terminates the bonus round with a bonus terminator. The outcome depends upon whether the player selects an award or a terminator.

In the above game, the controller of the gaming device randomly places a predetermined number of masked awards and terminators in the pattern at the beginning of the bonus round and maintains the positioning until the bonus round terminates. When the player selects a masked award, the player receives the value of the award, and the game typically displays a message that the player may continue and enables the player to select another masked award. The player then selects another masked award, and the process continues until the player selects a terminator.

Gaming machines also currently exist with secondary or bonus games or rounds in which the game selects or determines the player's award. In one such game, a slot machine having a video display contains a plurality of rotatable reels with game symbols. When the player receives a triggering symbol or combination, the game produces a bonus symbol. The bonus symbol moves from game symbol to game symbol temporarily changing the game symbol to a bonus symbol. If the change results in a winning combination, the player receives an award.

In the above-described "go-until" or "do-until" bonus round, the game can end quite quickly if the player selects a terminator early in the bonus round. A prior selection does not affect the current selection except to the extent that one less selection exists. The player blindly selects masked symbols until selecting the bonus terminator, which is immediately displayed. The player's involvement in the bonus round is thus limited. In the second known game, the game completely determines the bonus round award, and the player has no affect on the outcome.

Bonus rounds provide gaming manufacturers with the opportunity to add enjoyment and excitement to that which is already expected from a base game of the gaming device. Excitement and enjoyment increases when the interaction level between the bonus round and the player increases, and also when the bonus round remains compelling for an extended period of time. It is also desirable to provide a bonus round that remains compelling for an extended period of time even if the player does not ultimately fare well in the bonus round. Finally, it is desirable to have the possibility of providing a relatively large award to the player and allow the possibility to remain through a multitude of player selections.

SUMMARY OF THE INVENTION

The present invention provides a method and apparatus for determining an award in a wagering gaming device. The method and apparatus is employed for a primary or secondary game. The apparatus includes a display device operable to display to a player an initial set of different symbols such as values or value symbols. In one embodiment, the values are possible award values for the player. A processor of the gaming device sorts or divides the values of the initial set into a number of divisions or masked divisions displayed by the display device. The player selects one of the divisions. The amount of the values in each division is less than the number of different values available to the player before the player's selection. A selection of one of the divisions therefore eliminates, roots out or narrows the field of possible award values for the player. That is, when the player selects one of the divisions, one or more of the previously possible values are lost or eliminated. The game is structured, in one embodiment, such that it is likely that a number of relatively high values remain available throughout the multiple selection and narrowing process, keeping the player's interest peaked, and still providing a manageable overall average expected value for the game. When the narrowing sequence has occurred enough times so that the division that the player selects has only one value in one embodiment, the player receives that value and the game ends.

This application primarily describes the present invention in connection with values; however, it should be appreciated that the values could alternatively be awards, symbols or other suitable outcomes. In one embodiment, the display device displays an initial amount of values, wherein each value is different from each of the other values. The gaming device duplicates or repeats each of the values at least one time to create an overall set of values, wherein one of the values of that set ultimately becomes the player's award. The gaming device knows how many divisions into which the values of the set are divided. The gaming device determines whether the total number of values in the set is evenly divisible by the number of divisions. If not, the gaming device can add one or more values (referred to herein as mystery values or additional values) to the set of values so that a new total number of values for the set is evenly divisible by the number of divisions.

Next, the gaming device sorts or divides the total or adjusted total number of values of the set into a plurality of divisions. Up until that step, the player in one preferred embodiment is allowed to see the different values and the duplication of same. However, when the gaming device divides the values into the separate divisions, the gaming device masks the values associated with the divisions such that the player does not know which values are associated with each of the divisions. The player's success in the game of the present invention depends on selecting divisions having a higher total average value than other divisions. If the player is allowed to see the values of the different divisions, the player would attempt to select the most valuable division, rendering the game a skill game. The wagering gaming device of the present invention is in one preferred embodiment a game of luck and not skill. It should be appreciated that one or more (but not all) of the values, could be revealed to the player in an alternative embodiment.

In one embodiment, the gaming device follows a number of rules in duplicating and sorting the values. First, in duplicating the values, the gaming device in one embodiment does not duplicate any one value so many times that there is a higher total number of that value than there is a total number of divisions. In that manner the gaming device can sort the values so that no division includes the same value more than once. In sorting the values into the divisions, the gaming device only places any given value one time in any given division. An important feature of the game, however, is that the gaming device does not have to place, and indeed in the embodiment illustrated and described below does not place, each of the values into each of the divisions. It should be appreciated that the duplication of values in one embodiment, is evenly weighted one for one, and that in alternative embodiments, the duplication of values is not evenly weighted.

Each of the divisions is supplied with an amount such as a plurality of values. In one embodiment, each of the divisions includes the same amount of values, which coincides with the effort mentioned above to make the total set of values divisible evenly by the number of divisions. Also, the number of different types of values available to the player before selecting one of the divisions is more than the amount of values in each division. In that way, no matter which division the player selects, certain of the values are eliminated as award possibilities.

Given the fact that no division includes each of the different values in the preferred embodiment, the player's selection of a division will root out or eliminate certain of the values from being a possible award. The narrowing aspect of the gaming device depends on the fact that some of the overall set of values are left out of each of the masked divisions. Because the number of different values is greater than the amount of values in each division, no division includes each of the different values in this embodiment. In one embodiment, each division includes only one of any given value. This is accomplished by providing that no one value can exist in the set more times than the number of divisions.

The player hopes that one or more of the lower values is eliminated from possibility, increasing the likelihood of a larger award. After choosing one of the divisions, if the selected division has only one value, the gaming device provides that value to the player as the award. If that division has more than one value, in one embodiment the above-described process is repeated, wherein the initial set of different values includes the values of the division that the player has selected. Those values of that division are duplicated a number of times to create a set that is evenly divisible by the number of divisions, or as close to being evenly divisible as possible. If needed, one or more mystery values is added to the duplicated set. Alternatively, in a repeat cycle, the number of divisions can vary so as to produce an even number of values in each division without having to add mystery values.

The above loop is repeated until the divisions each have a single value in one embodiment. At that point, the player's selection of one of the divisions is in effect a selection of one of the remaining values. The gaming device provides the value of the selected division to the player in the form of a bonus award or base game award. In one embodiment, if the player receives a mystery value, the gaming device randomly selects any of the original set of different values for the player. In that manner, if the highest possible value had previously been excluded via one of the player's selections, that highest value could still be provided to the player via the mystery value. In an alternative embodiment, a predetermined or otherwise suitably determined value may be employed as the mystery value. If the game of the present invention is a bonus game, the gaming device returns the player to base game play after provision of the award to the player.

The values are displayed as numbers in the illustrated embodiments below. In alternative embodiments as mentioned above, symbols having or representing values or other outcomes are used instead of numbers. In either case, the player's ultimate outcome or award is directly or indirectly based on the value or symbol that the player ultimately picks. The term "value" as used herein thus includes a value indirectly obtained.

It is therefore an advantage of the present invention to provide an award generation game that involves a multitude of player selections.

It is a further advantage of the present invention to provide an award selection game that sequentially reveals the possible awards to the player so that the player can hope to attain one of the larger possible awards.

Another advantage of the present invention to provide an award generation game that has one or more relatively valuable awards, and wherein the player is likely to make multiple selections towards obtaining one of those relatively higher awards.

A further advantage of the present invention is to provide a game that keeps high value awards available through multiple rounds until later rounds of the game.

Another advantage of the present invention to provide an award generation scheme that provides the possibility that a player receives a large value award over a number of award elimination sequences, but wherein the scheme maintains a controllable and manageable average expected value outcome. Additional features and advantages of the present invention are described in, and will be apparent from, the following Detailed Description of the Invention and the figures.

DETAILED DESCRIPTION OF THE INVENTION

General

Figure 1A:
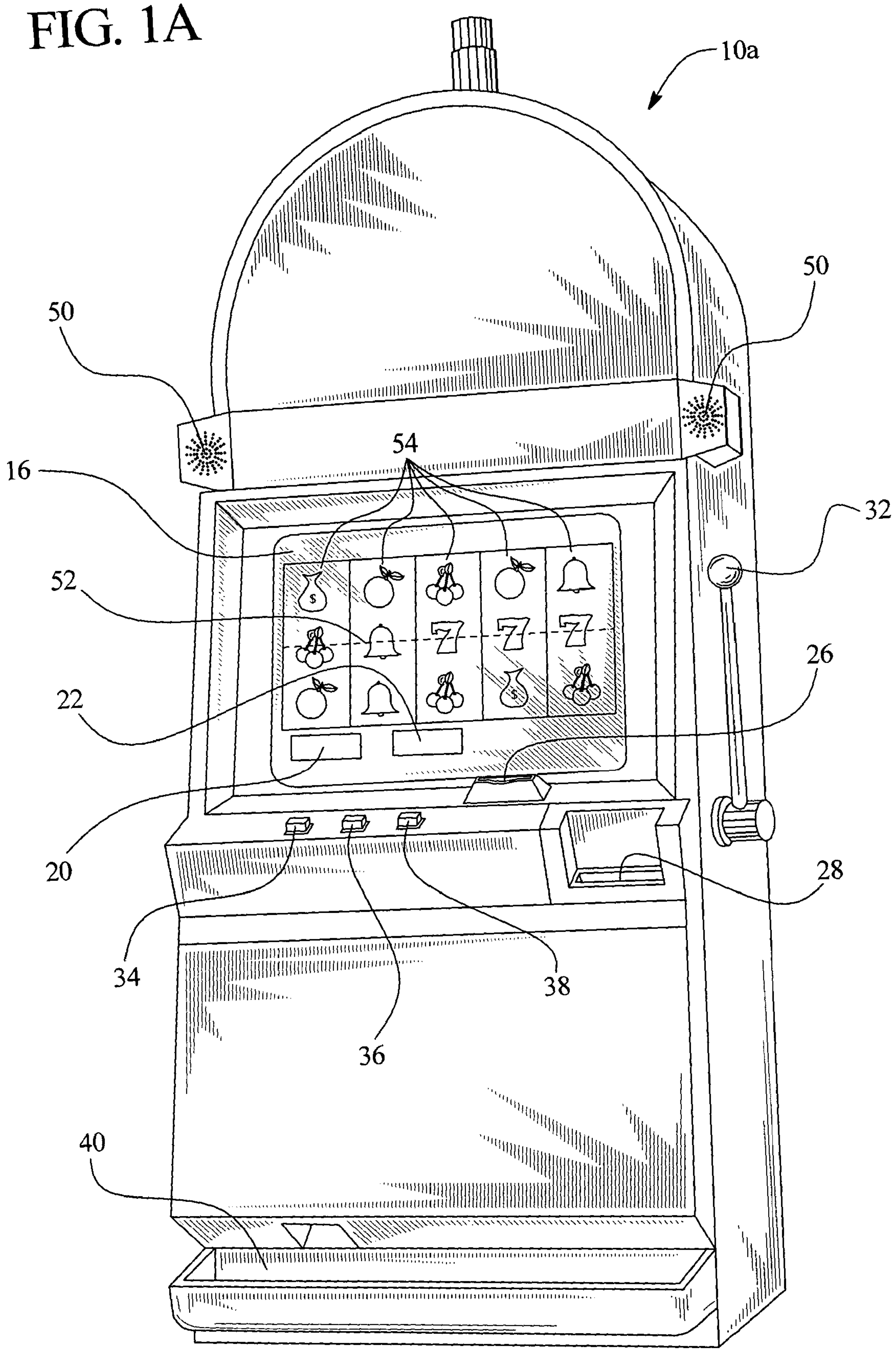
FIG. 1A is a front perspective view of one embodiment of the gaming device of the present invention.
Figure 1B:
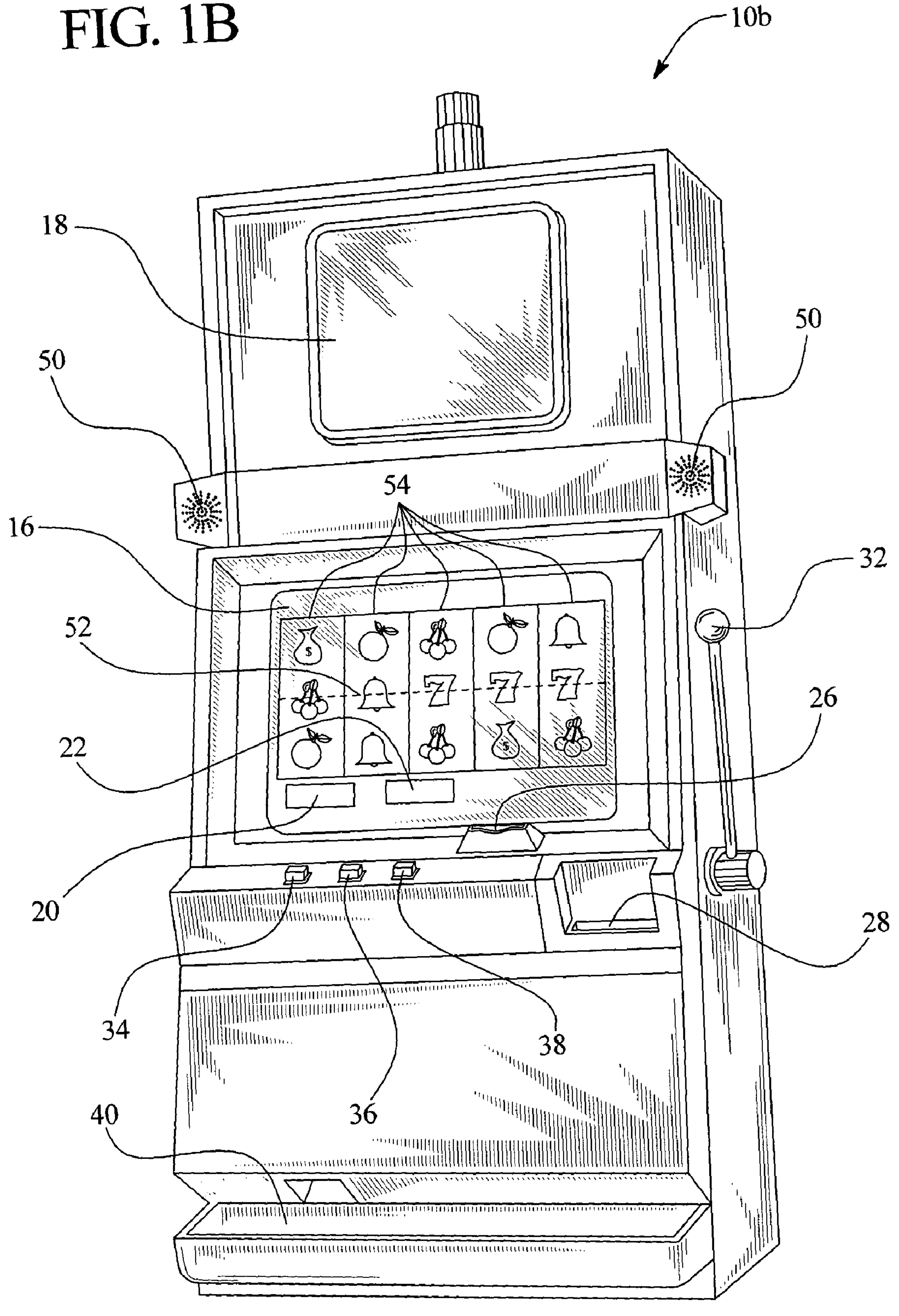
FIG. 1B is a front perspective view of another embodiment of the gaming device of the present invention.

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
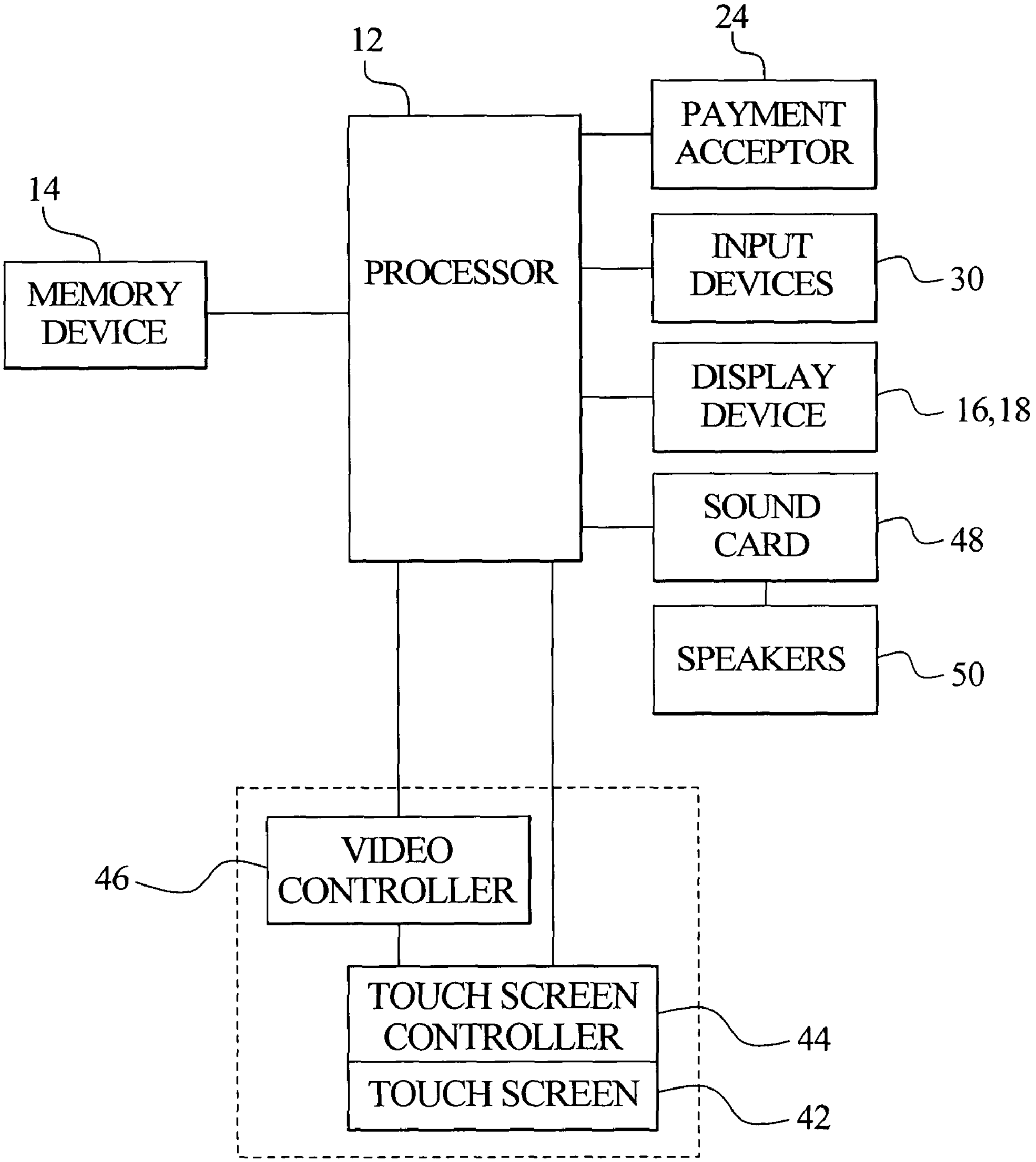
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. As seen in FIGS. 1A and 1B, in one embodiment, gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, rectangle, elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

Gaming device 10 can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented into the present invention.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device displays at least one and preferably a plurality of reels 54, such as three to five reels 54 in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In another embodiment, if the reels 54 are in video form, the plurality of simulated video reels 54 are displayed on one or more of the display devices as described above. Each reel 54 displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active pay line or otherwise occur in a winning pattern.

In one embodiment, a base or primary game may be a poker game wherein the gaming device enables the player to play a conventional game of video poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and replacement cards are dealt from the remaining cards in the deck. This results in a final five-card hand. The final five-card hand is compared to a payout table which utilizes conventional poker hand rankings to determine the winning hands. The player is provided with an award based on a winning hand and the credits the player wagered.

In another embodiment, the base or primary game may be a multi-hand version of video poker. In this embodiment, the player is dealt at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferable a plurality of the selectable indicia or numbers via an input device or via the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game; he must win or earn entry through play of the primary game and, thus, play of the primary game is encouraged. In another embodiment, qualification of the bonus or secondary game could be accomplished through a simple "buy in" by the player if, for example, the player has been unsuccessful at qualifying through other specified activities.

Figure 2B:
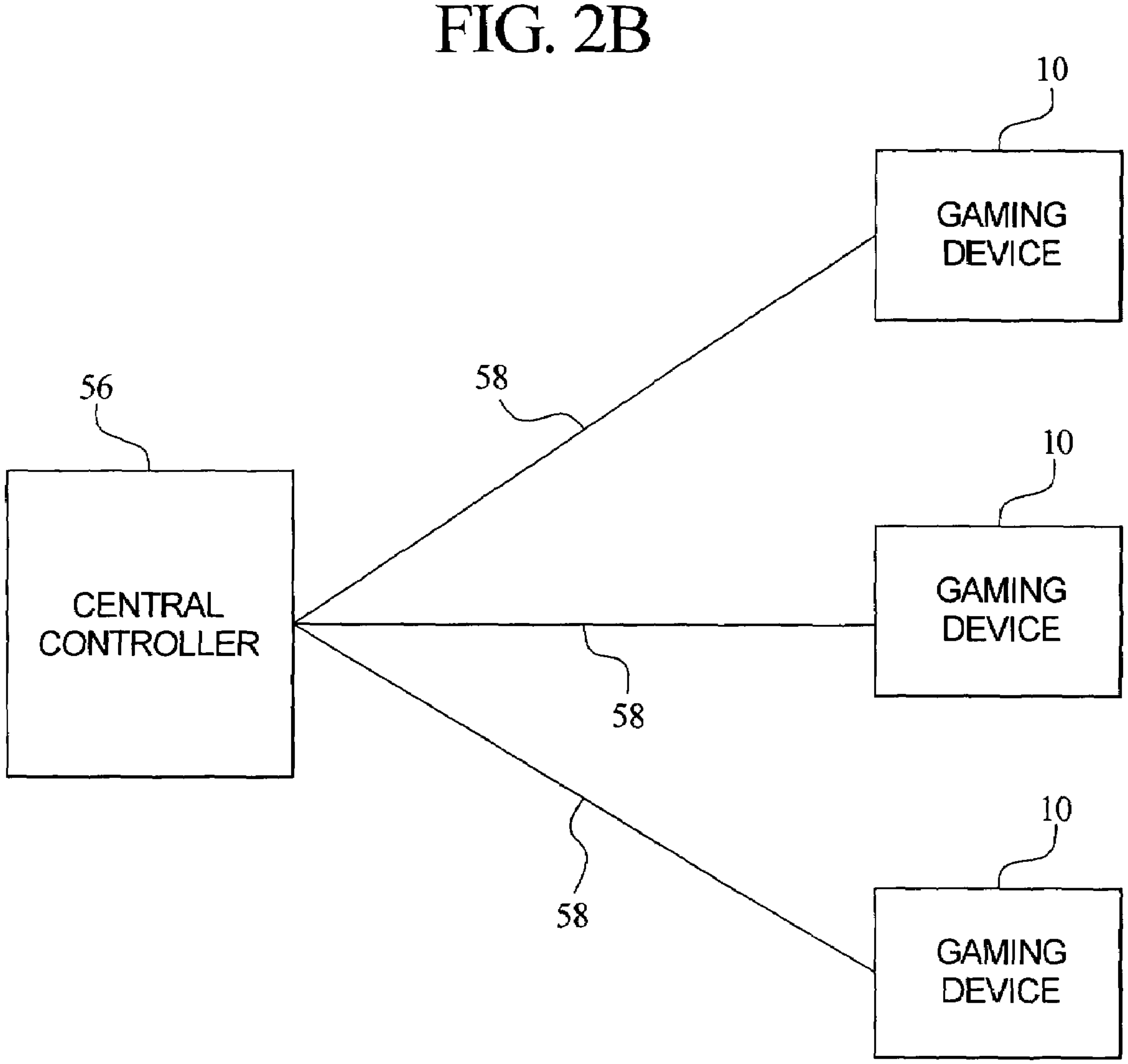
FIG. 2B is a schematic block diagram of various gaming devices employing the game of the present invention, wherein the devices are networked to a central controller.

In one embodiment, as illustrated in FIG. 2B, one or more of the gaming devices 10 of the present invention may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an Internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

Game Play

Figure 3:
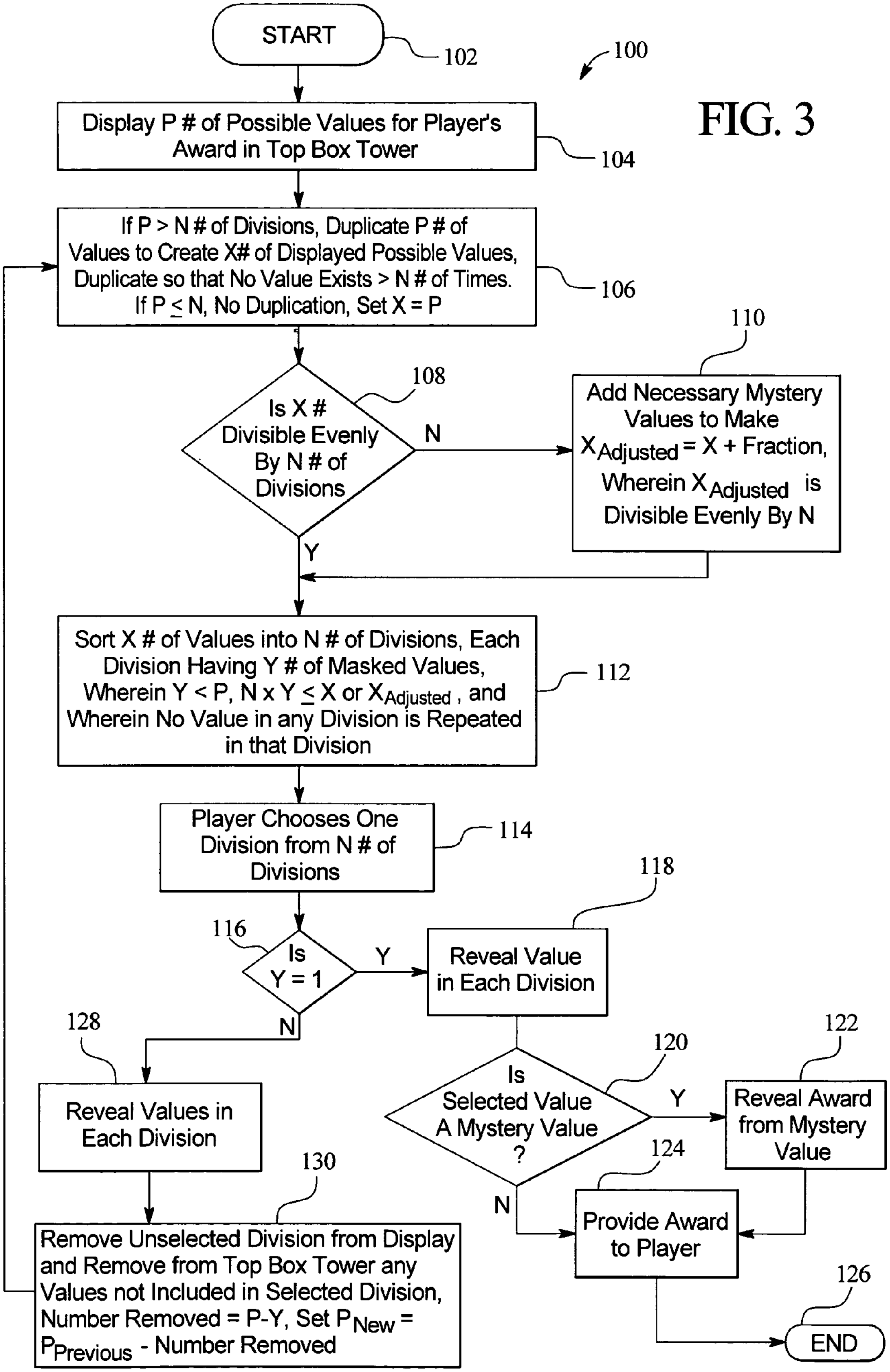
FIG. 3 is a logic flow diagram for one embodiment of the present invention.

Referring now to FIG. 3, flow diagram 100 illustrates one possible award generation sequence of one embodiment of the present invention. As will be seen, the sequence shows the player the possible awards. Certain of those awards are of a relatively large value. The game provides a number of sequences that narrow the field of possible awards. In many instances, the player is still able to receive one of the high value awards through a multitude or all of the sequences. Ultimately, the game provides a controllable and predictable outcome.

Upon starting the sequence 100, as indicated by oval 102, the gaming device displays in a display area such as a top box tower, "P" amount of different values that are each eligible to become the player's award. "P" amount is preferably more than two possible values. Starting sequence 100 can be via a base game triggering event that triggers sequence 100 as part of a bonus game. Alternatively, the start of the sequence 100 may be caused by a wager made by a player on a primary or base game.

The "P" amount of different awards is displayed on the top box of the gaming device in one embodiment as indicated by block 104. The top box area is generally that area housing display device 32 illustrated in FIG. 1B. FIGS. 4 to 10 illustrate an alternative embodiment where the "P" amount of different values is displayed in an area of video monitor 30 or 32.

Next, in one embodiment, if the amount of different values "P" is greater than a number of divisions ("N"), the gaming device duplicates the "P" amount of possible values to create "X" number of displayed values as indicated by block 106. As will become clear below, the "X" number of displayed values is divided into "N" number of divisions. In one preferred embodiment, the gaming device duplicates the "P" amount of values so that no value exists in total more than the number of divisions, i.e., more than "N" times. In one embodiment, if the amount of different values "P" is equal to or less than the number of divisions "N", the gaming device does not duplicate the "P" values, and instead sets "X" equal to "P". In an alternative embodiment, the gaming device can duplicate one or more of the "P" number of values.

The gaming device then determines whether the "X" number of displayed values is divisible evenly by the "N" number of divisions, as indicated by diamond 108. If not, the gaming device adds any necessary amount of "mystery" or other suitable additional values to make an "$X_{ADJUSTED}$" amount of values, as indicated by block 110. That is, the gaming device adds a number of additional or "mystery" values so that an adjusted set of "X" number of values is evenly divisible by the "N" number of divisions. In an alternative embodiment, the gaming device subtracts one or more values from the "X" number of values to make the "$X_{ADJUSTED}$" total that is evenly divisible by the number of divisions. The gaming device can add or subtract the same value more than one time or different values one or more times. Alternatively, the gaming device adds one or more mystery or additional values, which is described in more detail below.

In another embodiment, the gaming device does not adjust the "X" values; rather, the gaming device adjusts "N" so that "N" divides equally into the original "X" set of values. In yet another embodiment, the gaming device allows one or more of the "N" divisions to have an uneven amount or number of values. It should thus be appreciated that the gaming device could add additional duplicates of one or more of the values, add one or more new values, or add one or more previously eliminated values back into the divisions. It should also be appreciated that in an alternative embodiment, the gaming device can employ unequal numbers of values in two or more of the divisions.

In the embodiment where the number of divisions is evenly divisible into the "X" set of values, the gaming device sorts the "X" set of values into the "N" number of divisions, each having "Y" amount masked values, as indicated by block 112. As stated above, the sequence 100 of the present invention does not require that the "Y" number of values for each division be the same, but such is the case in one embodiment. Also, in one embodiment, the "Y" number of values for each division is less than the "P" amount of different values available to the player. Specifying that "Y" is less than "P" assures that the sorting operation indicated by block 112 serves to reduce the amount of "P" available values after the player's selection. Also, in one embodiment the "N" divisions multiplied by the "Y" values for each division is less than or equal to "X" or "$X_{ADJUSTED}$", as indicated by block 112.

As further indicated by block 112, the gaming device in one embodiment sorts values from the set of "X" values into the "N" divisions, so that no value is repeated in any division. This assures that each division includes a set that has only one of any given value. It should be appreciated, however, that the sequence 100 of gaming device 10 is alternatively operable when one or more of the values is inserted more than once into one or more of the "N" divisions. It should be appreciated that in doing so, the "P" amount of different values is reduced more drastically because available slots are consumed by repeat values as opposed to different values.

The player chooses one division from the "N" divisions, as indicated by block 114. After the player's selection, the game determines whether "Y" is equal to one in one embodiment. That is, for the player's selected division, the gaming device determines whether there is only a single value in that selected division. If so, and assuming that there is only a single value in each of the divisions, the gaming device reveals the single value in each division, as indicated by block 108. The reveal allows the player to see what the player could have chosen, increasing enjoyment and excitement.

After revealing the values as indicated by block 118, the gaming device determines whether the selected value is a mystery value, as indicated by diamond 120. If so, in one embodiment, the gaming device reveals an award from the mystery value as indicated by block 122. In one implementation, the revealed award from the mystery value is any of the "P" amount of possible values described above in connection with block 104. That is, even if one of the values has been eliminated via the sorting of values into divisions, the mystery value enables the player to recapture that value as an award. In a different embodiment, the mystery value is set to be a predefined value or to be randomly chosen from a set of values that is different than the initial "P" amount of different values.

If the selected value is not a mystery value, then the gaming device provides that value as an award to the player as indicated by block 124. Block 124 also indicates that the revealed award from the mystery value is provided to the player. Afterward, the sequence 100 ends as indicated by oval 126. If sequence 100 is a bonus game sequence, the gaming device returns the player to base game play. If the sequence 100 is a base or primary game or a portion thereof, the gaming device accepts another credit from the player to repeat play or enables the player to cash out as desired.

In the event that the player chooses from one of the "N" divisions and that division has more than one value contained therein, as indicated by diamond 116, the gaming device reveals the values in each division as indicated by block 128. Sequence 100 provides a fun and interesting game for the player in part because the sequence reveals the values of the player's selected division as well as values from non-selected divisions. In that manner, the gaming device enables the player to judge the player's relative success after each selection. It should be appreciated that sequence 100 does not require that each of the "Y" values in the "N" sets be revealed after each player selection. The game can reveal the values either sequentially or simultaneously.

The gaming device then removes the unselected divisions from the display and removes or indicates on the display device or top box tower that any values not included in the player's selected division are no longer available, as indicated by block 130. When the gaming device places only one of any particular value in any of the divisions, the amount of different values removed from play is equal to "P"–"Y". A new number of possible different values $P_{NEW}$ is then equal to $P_{PREVIOUS}$ less the number of possible different values removed, as indicated by block 130.

Sequence 100 includes a loop, wherein the remaining "P" amount of different values are duplicated to create a new "X" number of possible award values, as indicated by block 106. In any of the steps indicated by block 106, one, or more or all of the "P" values is duplicated. In the embodiments illustrated below, each of the "P" values is duplicated at least once. It should be appreciated, however, that fewer than all of "P" values can be duplicated in alternative embodiments. In another embodiment, the game is played in the reverse, where the set N includes the values to be eliminated.

Figure 4:
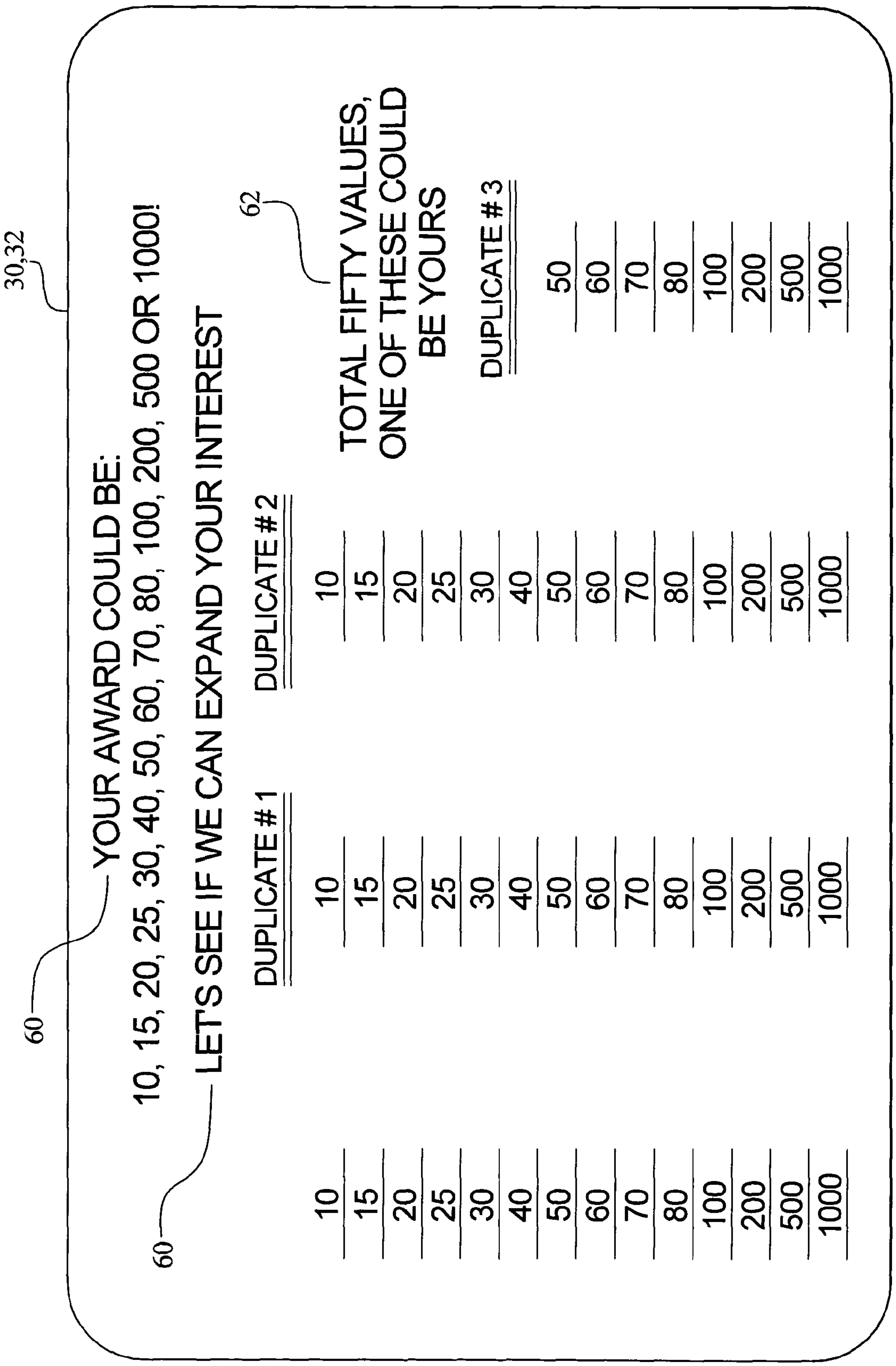
FIG. 4 is an elevation view of one the display devices of the gaming device illustrating an initial screen of one embodiment of the present invention.

Referring now to FIGS. 4 through 10, an example of the sequence 100 described in connection with FIG. 3 is illustrated. FIG. 4 illustrates an initial screen, which is displayed on one of the display devices 30 or 32. The screen of FIG. 4 provides a message 60 indicating that the "P" amount of different values includes initially the values ten, fifteen, twenty, twenty-five, thirty, forty, fifty, sixty, seventy, eighty, one-hundred, two-hundred, five-hundred and one-thousand.

The message 60, which is audio, visual, or audiovisual, also informs the player of the duplication of the different "P" values. In FIG. 4, the values ten to forty are each duplicated twice so that each exists a total of three times in the overall set. The values fifty through one-thousand are each duplicated three times, so that each of those values exists four times overall in the total set of "X" values. As will be seen below, the total of fifty ("X") values is divided into five ("N") divisions. It should be appreciated that none of the values is duplicated more than three times to have four like values in the illustrated embodiment. Gaming device 10 displays another audio, visual, or audiovisual message 62 informing the player that one of the fifty values will ultimately be awarded to the player.

The set of values illustrated in the duplicated list in FIG. 4 is the set of all possible values, including repeats, from which the player's award is chosen, i.e., the "X" set. The player viewing the set in FIG. 4 realizes that there are four possible one-thousand values available, four possible five-hundred values available, four possible two-hundred values available, as well as three possible fifteen values and three possible ten values, etc. The set of fifty values in FIG. 4 provides the player a perspective on the player's chances of obtaining any one of the values as a possible award.

Figure 5:
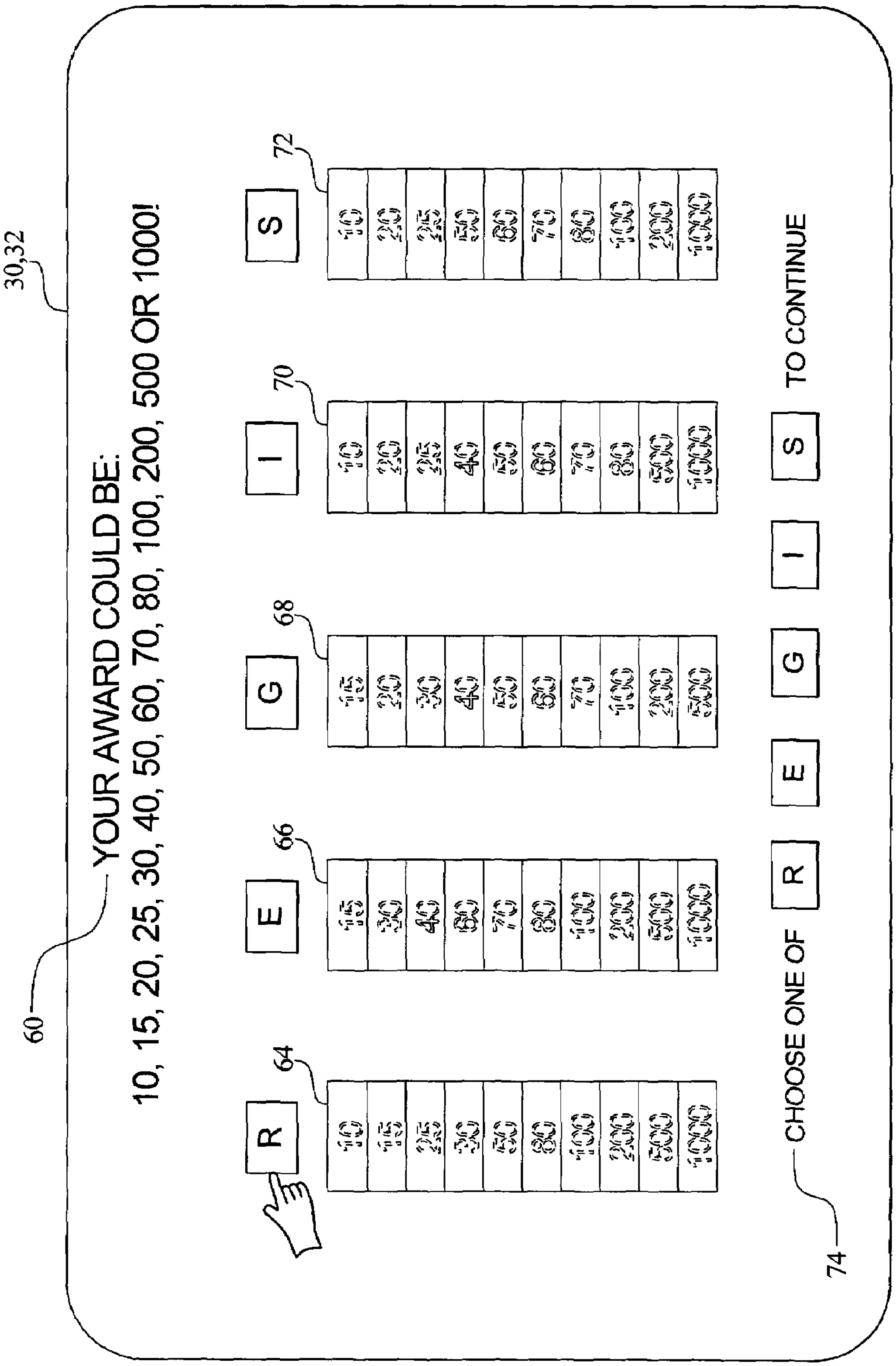
FIG. 5 is an elevation view of one of the display devices illustrating a second screen of one embodiment of the present invention.

Referring now to FIG. 5, the gaming device sorts the set of fifty values illustrated in FIG. 4 into five ("N") divisions 64 to 72 of ten ("Y") values each. The values in each division 64 to 72 are hidden or masked from the player and are therefore illustrated in phantom. Because each division 64, 66, 68, 70 and 72 contains only ten values in this example, and because there are fourteen possible different values for the player to win at this point in the game, as indicated by message 60, each division 64, 66, 68, 70 and 72 can have at most ten different values. The number of different "P" values is therefore reduced at least by four. In the illustrated embodiment, each division 64 to 72 has only one of any particular value. Therefore, each division 64 to 72 has four less different ("$P_{NEW}$") values than the original number of fourteen different ("$P_{PREVIOUS}$") values. In an alternative embodiment, gaming device 10 enables one or more of the values to be repeated in one or more of the divisions 64, 66, 68, 70 and 72, wherein those divisions can forfeit more than four values.

Gaming device 10 in FIG. 5 displays an audio, visual, or audiovisual message 74 indicating to the player to press one of the plurality of selectors "R", "E", "G", "I" and "S" associated respectively with the divisions 64 to 72 to continue. The selectors in one embodiment are areas of the touch screen 50 associated with the video monitor 30 or 32 that each send discrete signals to the processor 38. Alternatively, the selectors are electromechanical input devices 44 that are located on a panel of gaming device 10, which send discrete electrical inputs to the processor 38. In FIG. 5, the player presses the "R" selector for the division 64.

Figure 6:
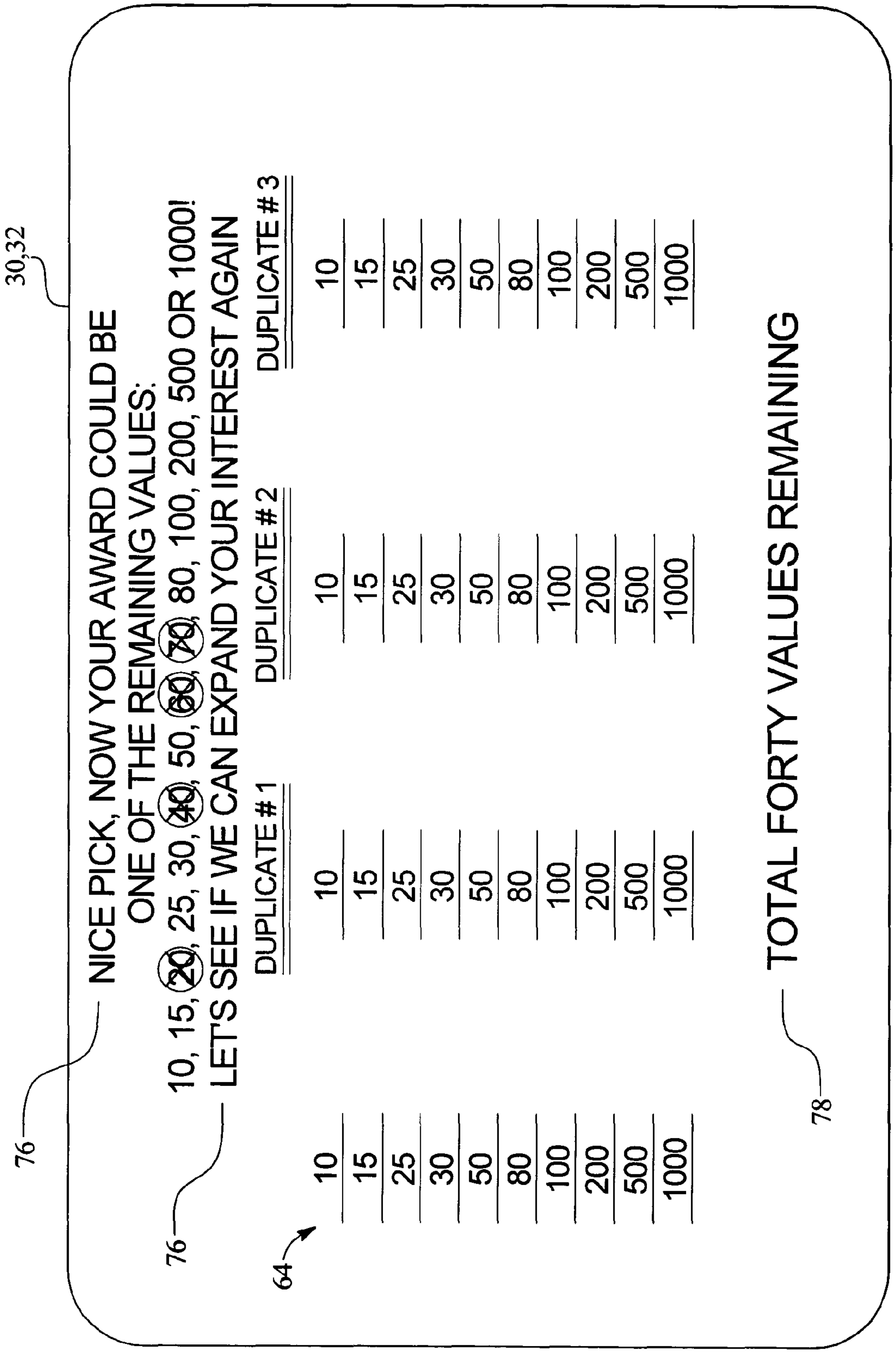
FIG. 6 is an elevation view of one of the display devices illustrating a third screen of one embodiment of the present invention.

Referring now to FIG. 6, gaming device 10 discards the divisions 66 to 72 in FIG. 5 and reveals the selected division 64 to the player. Gaming device 10 also eliminates any of the values not present in the selected division 64 from award possibility, as indicated by message 76. Message 76 illustrates that the twenty, forty, sixty and seventy values are no longer available. The remaining values in message 76 correspond to the values of revealed selected division 64.

Message 76 also informs the player that each of the remaining values, i.e., the values of division 64 ("$P_{NEW}$"), are each duplicated once again. This time, each of the $P_{NEW}$ values is duplicated three times, creating a overall set ("$X_{NEW}$") of forty values as indicated by message 78. The player viewing the screen of FIG. 6 notes that four one-thousand values still remain, four five-hundred values still remain, four two-hundred values still remain and four one-hundred values still remain.

Figure 7:
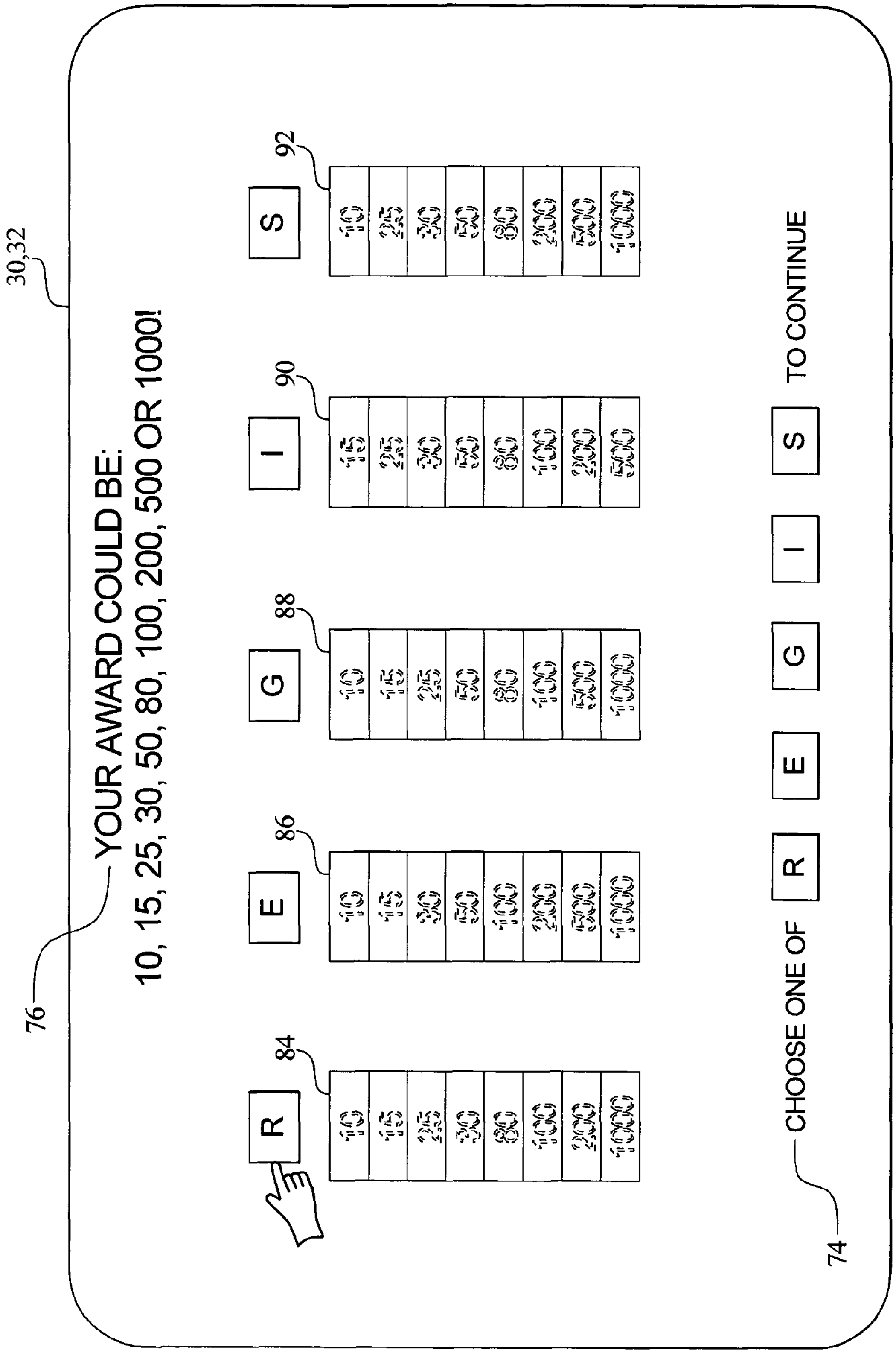
FIG. 7 is an elevation view of one of the display devices illustrating a fourth screen of one embodiment of the present invention.

Referring now to FIG. 7, gaming device 10 sorts the displayed values of FIG. 6 once again into five masked divisions 84 to 92 (values shown in phantom for purposes of illustration of the masking). Gaming device 10 repeats the message 76 that the player's award could be any of the remaining values ten, fifteen, twenty-five, thirty, fifty, eighty, one-hundred, two-hundred, five-hundred and one-thousand. Divisions 84 to 92 each include the same "Y" number of values, namely, eight. No two divisions 84 to 92 include the same values and no division includes two of any given value. Each division therefore eliminates different values as above in connection with FIG. 5.

Because each division includes only eight values, and because ten values were previously available, each division eliminates two of the values from award possibility. If the divisions are allowed to have more than one of one or more values, then the divisions could eliminate more than two values. Gaming device 10 displays the message 74 telling the player to choose one of the selectors "R", "E", "G", "I" and "S" to choose a respective division 84 to 92 to continue game play. As illustrated in FIG. 7, the player again picks the "R" selection associated with the division 84.

Figure 8:
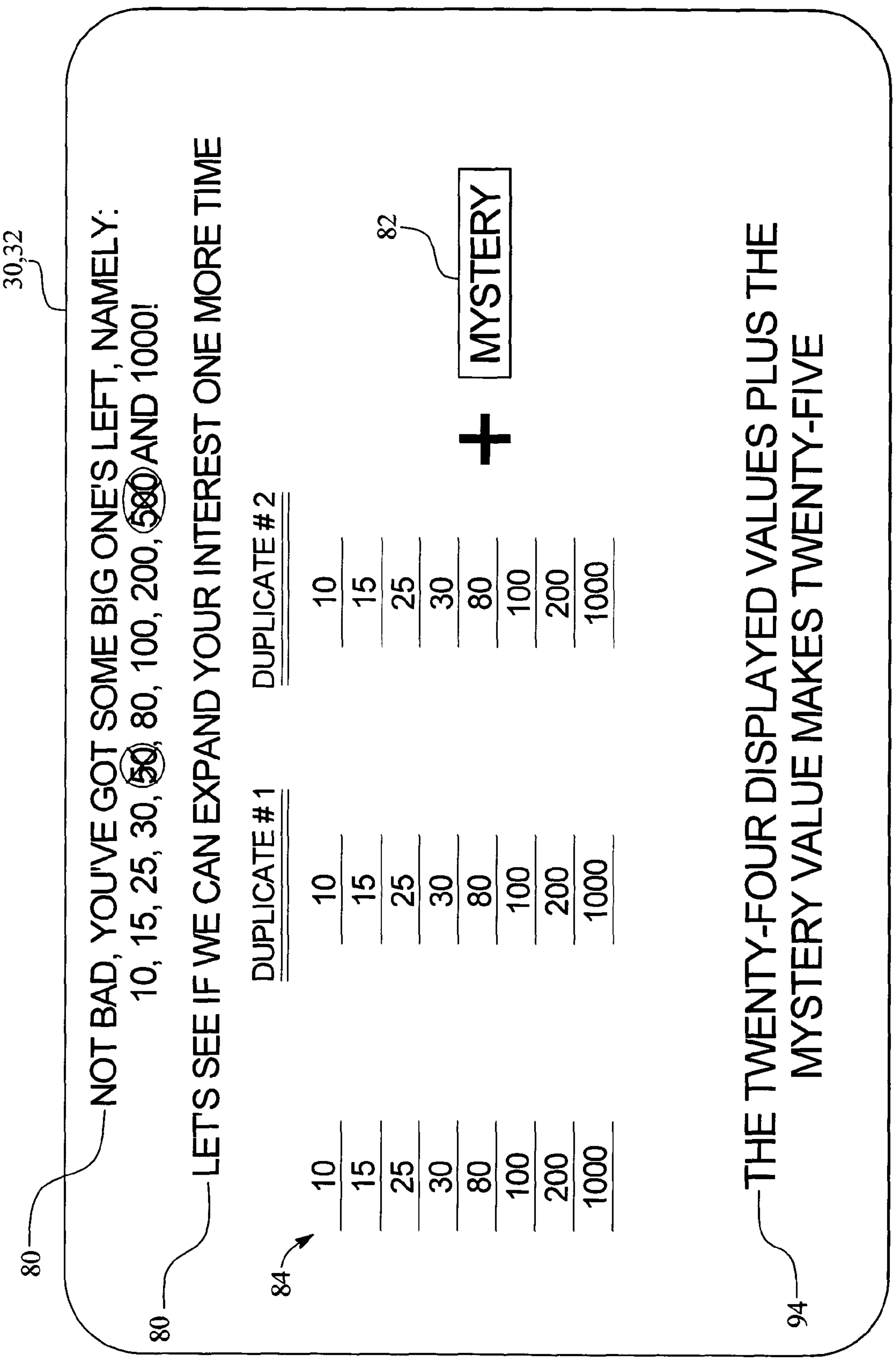
FIG. 8 is an elevation view of one of the display devices illustrating a fifth screen of one embodiment of the present invention.

Referring now to FIG. 8, the next screen displays the values of the selected division 84 to the player. The player sees that the ten, fifteen, twenty-five, thirty, eighty, one-hundred, two-hundred and one-thousand values are still available. The game provides a message 80 indicating that the values fifty and five-hundred have been lost via the selection of division 84. Once again, gaming device 10 expands the remaining values each two times to create a set of twenty-four displayed values.

As described above, the gaming device 10 in one preferred embodiment places the same number of "Y" values into each division. To do so, the total set of values before sorting must be evenly divisible by the number of divisions. Previously, the total amount of values of fifty (FIG. 4) and forty (FIG. 6) have each been evenly divisible into the five divisions. In FIG. 8, gaming device 10 faces a situation in which only twenty-four values have been created via duplication. In the illustrated embodiment, gaming device 10 adds a mystery value 82 to create a total set of twenty-five values. Alternatively, gaming device 10 duplicates one of the values an additional time. Further alternatively, gaming device 10 duplicates four less values. Further alternatively, gaming device 10 sorts the values into five divisions so that one of the divisions has one less value. The message 94 indicates that in the illustrated embodiment, twenty-four displayed values plus the mystery value 82 make twenty-five, which are divisible evenly into five divisions.

Figure 9:
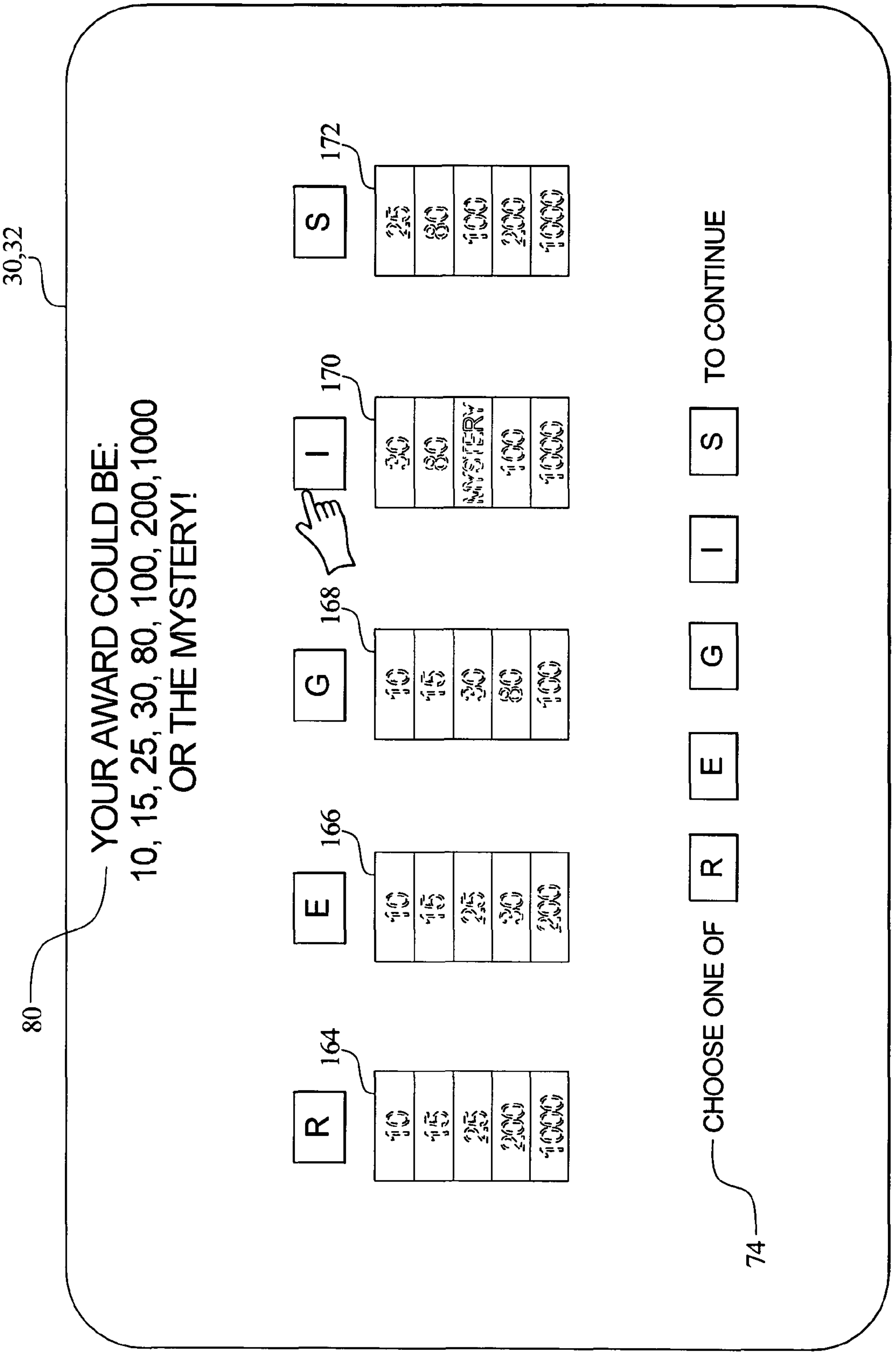
FIG. 9 is an elevation view of one of the display devices illustrating a sixth screen of one embodiment of the present invention.

Referring now to FIG. 9, gaming device 10 sorts the twenty-four displayed values and the mystery value 82 into five masked divisions 164 to 172 of five ("Y") values each (shown in phantom). Divisions 164 to 172 mask the values as before. Each division 164 to 172 eliminates three of the previously available "P" values from availability. The message 80 indicates that the player can still achieve the ten, fifteen, twenty-five, thirty, eighty, one-hundred, two-hundred, one-thousand or the mystery value. The message 74 prompts the player to choose one of the selectors "R", "E", "G", "I" and "S" associated respectively with divisions 164 to 172 to continue the game. As illustrated, the player selects the "I" selector.

In FIGS. 5 and 7, the player selects a division from a multitude of divisions that each have more than five values, i.e., more than the "N" number of divisions. In FIG. 9, each of the divisions 164 to 172 includes only five values. Each of the divisions 164 to 172 also includes a unique set of values. It should be appreciated that at this point even if the game duplicated any of the values from any one of the divisions 164 to 172, the duplicated set would only have five different types of values, and that because the game provides five divisions, the values have been sorted as much as possible.

Importantly, three of the five divisions in FIG. 9 still provide the player with the opportunity to achieve the award of one-thousand. Three of the divisions provide the player with a chance to win an award of two-hundred. When divisions 164 and 172 are ultimately revealed to the player, the player will notice those opportunities and motivate the player to play the game again. The ultimate outcome is, however, controllable and repeatable, making the game suitable for wagering.

Figure 10:
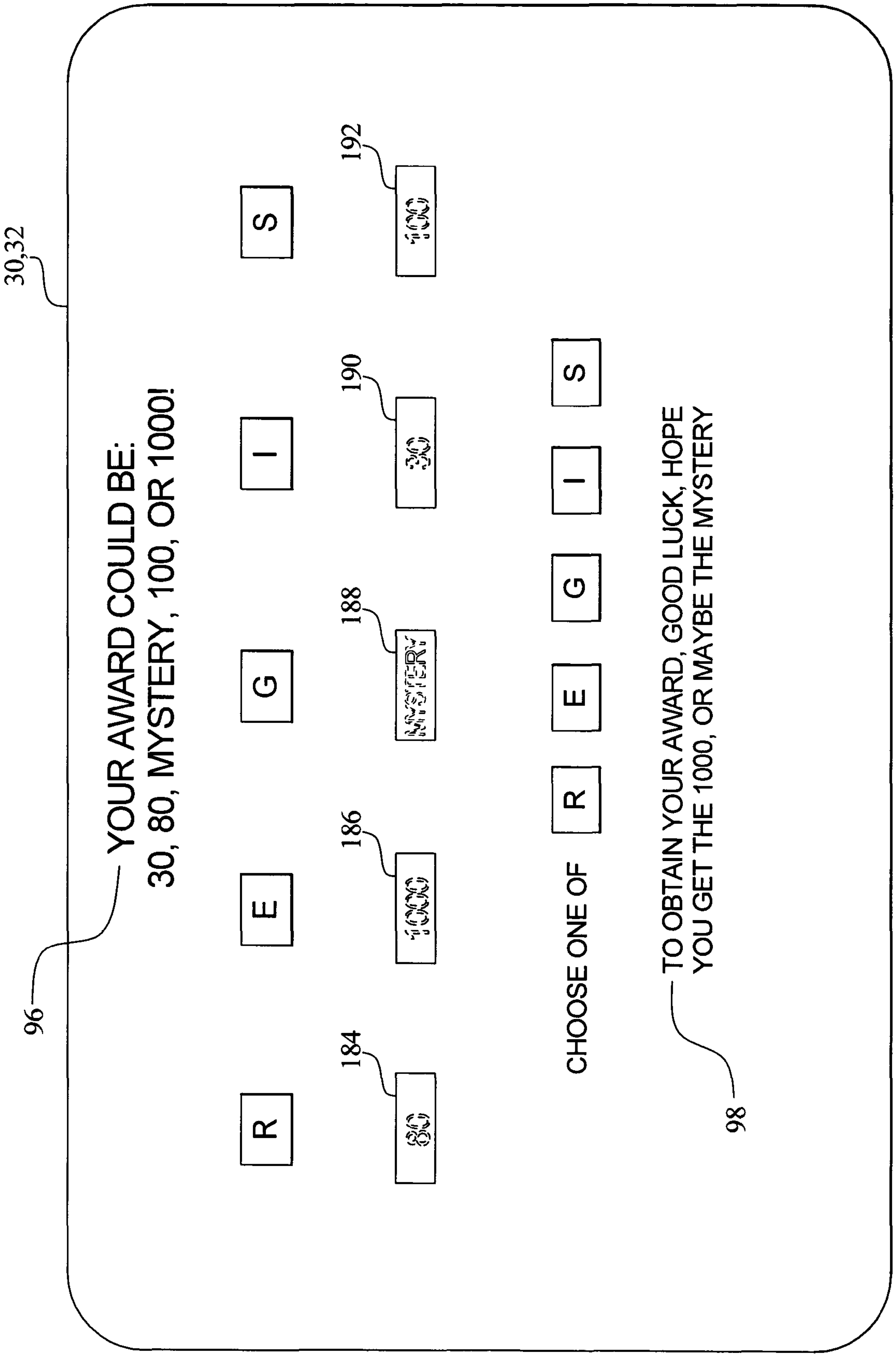
FIG. 10 is an elevation view of one of the display devices illustrating a seventh screen of one embodiment of the present invention.

Referring now to FIG. 10, gaming device 10 does not duplicate the values of the selected division 170 (associated with the "I" selector) of FIG. 9, but rather, gaming device 10 places one of each of those values in the divisions 184 to 192. A message 96 informs the player that the player's award will be one of the thirty, eighty, the mystery, one-hundred or one-thousand values. The message 98 informs the player to choose one of the selectors "R" to "S" to obtain the player's award.

In FIG. 10, if the player selects the "E" selection for division 186, gaming device 10 provides an award of one-thousand to the player because it is the only value in that division 186. If on the other hand the player selects the "G" selection, gaming device 10 provides the sole value of division 188 to the player, which is the mystery value. At that point, as described above, gaming device 10 either provides a predetermined award for the mystery value, draws randomly from the original "P" amount of different values or draws randomly from a separate set of values, such as a set of higher value awards. The set of values can be weighted so that the mystery value is more likely to yield a high value award. Or the set could include only high value awards. Further, the mystery value could be a high value award. The mystery value thus enables the player to win one of the values that has been previously eliminated from play, e.g., a high value award.

The gaming device in one embodiment reveals the values in each of the divisions 184, 186, 188, 190 and 192, which allows the player to see each of the awards the player could have won. Once the player receives one of the values as an award, gaming device 10 updates the player's credit meter 16 and either returns the player to base game play or awaits the player's decision to wager another credit or cashout.

The values in the embodiments illustrated are each number. The award provided to the player is the value ultimately picked by the player. A direct relationship exists in this embodiment between the player's award and the value provided, wherein the award is based on the value because the award equals the value.

In an alternative embodiment, the award is based on a plurality of values associated with the player's selection. In this embodiment, the process stops before one value is associated with each division. The award can be determined based on an addition of the values or other suitable function associated with the values.

In alternative embodiments, the award is indirectly based on the value. For example, the player's award can be the player selected value multiplied by a preset or randomly determined multiplier. Alternatively, other types of symbols besides numbers are used. Letters or other indicia that correspond to a number of credits or other type of award can be employed. For example, different types of fruit can be displayed instead of the numbers, wherein one type of fruit corresponds to ten credits, another to forty credits, a third to two-hundred credits, etc.

The player who understands that, e.g., the banana and the apple correspond to high value awards, experiences the same type of enjoyment and excitement as the player playing the game with numbers. Using symbols other than numbers enables the game implementor to tailor the game to an overall theme of gaming device.

In further embodiments, the outcome provided to the player can be based on multiple rounds of the game where the player accumulates zero, one or more symbols in each round. At the end of those rounds, the accumulated symbols determine the outcomes. Thus, it should be appreciated that the present invention can be employed to determine one or more symbols for a game, one or more awards for a game, or one or more outcomes for a game.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A method of operating a gaming device having a game operable upon a wager, said method comprising:

(a) displaying a plurality of different symbols to a player;

(b) sorting said symbols into a plurality of divisions of symbols without revealing to the player which symbols are sorted into which divisions;

(c) enabling the player to select one of the divisions of symbols;

(d) decreasing the amount of different symbols if the selected division includes more than one symbol;

(e) displaying the remaining different symbols to the player if the selected division includes more than one symbol;

(f) repeating (b) to (e) if the selected division includes more than one symbol, wherein the amount of the remaining different symbols displayed equals the amount of different symbols in the selected division; and (g) providing an outcome to the player based on the symbol of the selected division if the symbol is the only symbol in the selected division.

2. The method of claim 1, which includes duplicating at least one of the symbols before sorting the symbols into the divisions, wherein the symbols resulting from duplication are sorted into the divisions.

3. The method of claim 1, wherein (a) to (g) are controlled via a data network.

4. The method of claim 3, wherein the data network includes an internet.

5. The method of claim 1, wherein instructions for implementing (a) to (g) are stored on a computer storage device.

6. The method of claim 1, wherein each of said plurality of different symbols is a number representing an award.

7. A method of operating a gaming device having a game operable upon a wager by a player, said method comprising:

(a) displaying a plurality of different symbols to the player;

(b) sorting said symbols into a plurality of divisions of symbols without revealing to the player which symbols are sorted into which divisions;

(c) enabling the player to select one of the divisions of symbols;

(d) decreasing the amount of different symbols if the amount of different symbols in the selected division is greater than the current number of divisions;

(e) displaying the remaining different symbols to the player if the amount of different symbols in the selected division is greater than the current number of divisions;

(f) repeating (b) to (e) at least once, wherein the amount of the remaining different symbols displayed equals the amount of symbols in the selected division; and (g) providing an outcome to the player based on any symbols in the selected division after repeating (b) to (e) at least once.

8. The method of claim 7, which includes duplicating at least one of the symbols to create a set of symbols before sorting.

9. The method of claim 7, wherein (a) to (g) are controlled via a data network.

10. The method of claim 9, wherein the data network includes an internet.

11. The method of claim 7, wherein instructions for implementing steps (a) to (g) are stored on a computer storage device.

12. The method of claim 7, wherein each of said plurality of different symbols is a number representing an award.

13. A method of operating a gaming device having a game operable upon a wager by a player, said method comprising:

(a) displaying a plurality of different symbols to the player;

(b) sorting said symbols into a plurality of divisions of symbols without revealing to the player which symbols are sorted into which divisions;

(c) enabling the player to select one of the divisions of symbols;

(d) decreasing the amount of different symbols based on the symbols sorted into the selected division if the selected division has a number of symbols greater than a designated number of symbols, said designated number being greater than one;

(e) displaying the remaining different symbols to the player if the selected division has a number of symbols greater than said designated number of symbols;

(f) repeating (b) to (f) until the selected division has said designated number of symbols; and (g) providing an outcome to the player based on any of the symbols of the selected division if the selected division has said designated number of symbols.

14. The method of claim 13, which includes duplicating at least one of the symbols to create a set of symbols before sorting.

15. The method of claim 13, wherein (a) to (g) are controlled via a data network.

16. The method of claim 15, wherein the data network includes an internet.

17. The method of claim 13, wherein instructions for implementing (a) to (g) are stored on a computer storage device.

18. The method of claim 13, wherein each of said plurality of different symbols is a number representing an award.

19. A method of operating a gaming device having a game operable upon a wager by a player, said method comprising:

(a) displaying a plurality of different symbols to the player;

(b) sorting said symbols into a plurality of divisions of symbols without revealing to the player which symbols are sorted into which divisions;

(c) enabling the player to select one of the divisions of symbols;

(d) decreasing the amount of different symbols if the number of symbols in the selected division is greater than the current number of divisions of symbols;

(e) displaying the remaining different symbols;

(f) repeating (b) to (f) until an amount of different symbols previously displayed in (e) is the same as the current number of divisions of symbols; and (g) providing an outcome to the player based on any of the symbols of the selected division when the amount of different symbols previously displayed in (e) is the same as the current number of divisions of symbols.

20. The method of claim 19, which includes duplicating at least one of the symbols to create a set of symbols before sorting.

21. The method of claim 19, wherein steps (a) to (g) are controlled via a data network.

22. The method of claim 21, wherein the data network includes an internet.

23. The method of claim 19, wherein instructions for implementing (a) to (g) are stored on a computer storage device.

24. The method of claim 19, wherein each of the plurality of different symbols is a number representing an award.

25. A method of operating a gaming device having a game operable upon a wager, said method comprising:

(a) displaying a plurality of different symbols to a player;

(b) sorting said symbols into a plurality of divisions of symbols without revealing to the player which symbols are sorted into which divisions;

(c) enabling the player to select one of the divisions of symbols;

(d) decreasing the amount of different symbols if the amount of symbols in the selected division is greater than the current number of divisions;

(e) displaying the remaining different symbols to the player if the amount of symbols in the selected division is greater than the current number of divisions;

(f) repeating steps (b) to (f) until the amount of symbols in a previously selected division equals the current number of divisions; and (g) providing an outcome to the player based on any of the symbols of the selected division when the amount of symbols in the previously selected division equals the current number of divisions.

26. The method of claim 25, which includes duplicating at least one of the symbols to create a set of symbols before sorting.

27. The method of claim 25, wherein (a) to (g) are controlled via a data network.

28. The method of claim 27, wherein the data network includes an internet.

29. The method of claim 25, wherein instructions for implementing (a) to (g) are stored on a computer storage device.

30. The method of claim 25, wherein each of said plurality of different symbols is a number representing an award.

31. A method of operating a gaming device having a game operable upon a wager by a player, said method comprising:

(a) displaying a plurality of different symbols to the player;

(b) sorting said symbols into a plurality of divisions of symbols without revealing to the player which symbols are sorted into which divisions;

(c) enabling the player to select one of the divisions of symbols;

(d) decreasing the amount of different symbols placed in the divisions in the next occurrence of (b) if the selected division has more than one symbol;

(e) displaying the remaining different symbols to the player if the selected division has more than one symbol;

(f) repeating (b) to (e) if the selected division has more than one symbol; and (g) providing an outcome to the player based on the symbol of the selected division if the symbol is the only symbol in the selected division.

32. The method of claim 31, which includes duplicating at least one of the symbols to create a set of symbols before sorting.

33. The method of claim 31, wherein (a) to (g) are controlled via a data network.

34. The method of claim 33, wherein the data network includes an internet.

35. The method of claim 31, wherein instructions for implementing (a) to (g) are stored on a computer storage device.

36. The method of claim 31, wherein each of said plurality of different symbols is a number representing an award.

* * * * *